United States Patent
Syngal et al.

(10) Patent No.: US 11,838,301 B2
(45) Date of Patent: Dec. 5, 2023

(54) SYSTEM FOR DETECTION OF ENTITIES ASSOCIATED WITH COMPROMISED RECORDS

(71) Applicant: MASTERCARD INTERNATIONAL INCORPORATED, Purchase, NY (US)

(72) Inventors: Sonali Syngal, Gurgaon (IN); Kanishk Goyal, Alwar (IN); Suhas Powar, Kolhapur (IN); Ankur Saraswat, Gurgaon (IN); Debasmita Das, Kolkata (IN); Yatin Katyal, Rohtak (IN)

(73) Assignee: Mastercard International Incorporated, Purchase, NY (US)

( * ) Notice: Subject to any disclaimer, the term of this patent is extended or adjusted under 35 U.S.C. 154(b) by 287 days.

(21) Appl. No.: 17/243,201

(22) Filed: Apr. 28, 2021

(65) Prior Publication Data
US 2022/0353275 A1 Nov. 3, 2022

(51) Int. Cl.
*H04L 29/06* (2006.01)
*G06F 16/21* (2019.01)
(Continued)

(52) U.S. Cl.
CPC ........ *H04L 63/1416* (2013.01); *G06F 16/219* (2019.01); *G06F 16/2462* (2019.01);
(Continued)

(58) Field of Classification Search
CPC . H04L 63/1416; H04L 63/102; H04L 63/104; H04L 63/1425; G06F 16/219; G06F 16/2462
See application file for complete search history.

(56) References Cited

U.S. PATENT DOCUMENTS 10,776,788 B2\* 9/2020 Williams ............... G06Q 20/34
2013/0262328 A1\* 10/2013 Federgreen ............ G06Q 10/10
705/317

(Continued)

FOREIGN PATENT DOCUMENTS

WO 2020023003 A1 1/2020

OTHER PUBLICATIONS

Kerschbaumer, J., European Search Report corresponding to EP Application No. 22 16 4849.6, dated Sep. 23, 2022, 8 pages.

*Primary Examiner* — Abiy Getachew
*Assistant Examiner* — Afaq Ali
(74) *Attorney, Agent, or Firm* — Barta, Jones & Foley, PLLC

(57) ABSTRACT

The disclosure herein describes a system and method for predictive identification of breached entities. Identification number and expiration date pairs associated with compromised records in a source file are analyzed to identify a set of candidate entities having records at least partially matching the source file data pairs having events occurring during a selected time period. Probability vectors are calculated for records associated with each identified entity. A divergence value is calculated which represents a distance between probability distribution vectors for each entity and probability distribution vectors for the source file. A predicted breached entity is identified based on the divergence values. The predicted breached entity is notified of the predicted breach. The notification can include an identification of the breached entity, identification of breached records, predicted time of breach, and/or a recommendation to take action to mitigate the predicted breach.

20 Claims, 17 Drawing Sheets

(51) Int. Cl.
*G06F 16/2458* (2019.01)
*H04L 9/40* (2022.01)

(52) U.S. Cl.
CPC .......... *H04L 63/102* (2013.01); *H04L 63/104* (2013.01); *H04L 63/1425* (2013.01)

(56) References Cited

U.S. PATENT DOCUMENTS

| | | | |
|---|---|---|---|
| 2017/0026396 A1* | 1/2017 | Michel | G06Q 20/382 |
| 2018/0121922 A1 | 5/2018 | Zoldi et al. | |
| 2019/0274115 A1* | 9/2019 | Kim | H04W 4/021 |
| 2019/0318126 A1* | 10/2019 | Mascaro | G06F 16/9535 |
| 2019/0332938 A1* | 10/2019 | Gendron-Bellemare | G06N 3/08 |
| 2020/0279050 A1* | 9/2020 | Endler | G06F 21/6218 |
| 2021/0223765 A1* | 7/2021 | Nakabayashi | G05B 23/027 |
| 2021/0279731 A1* | 9/2021 | Agrawal | G06Q 20/322 |

* cited by examiner

800

| Category | Percentage | Cumulative |
|---|---|---|
| Top 1 | 15% | 15% |
| In Top 10 | 30% | 45% |
| In Top 25 | 20% | 65% |
| In Top 50 | 10% | 75% |
| In Top 100 | 5% | 80% |

SOURCE FILE 1302

| BIN | EXP DATE | FREQ | VECTORS |
|---|---|---|---|
| BIN 1 | EXP 1 | 2 | 0.66667 |
| BIN 2 | EXP 2 | 1 | 0.33333 |

MERCHANT AT TIME PERIOD 1 1304

| BIN | EXP DATE | FREQ | VECTORS |
|---|---|---|---|
| BIN 1 | EXP 1 | 100,000 | 0.961538 |
| BIN 2 | EXP 2 | 4,000 | 0.038462 |

*FIG. 13*

| TABLE 1 | |
| --- | --- |
| merchant_dba_name | bhatta |
| UNIFORMS AND ACCESSORIES | 0.07357628 |
| ABC | 0.210426303 |
| XYZ | 0.240746128 |

FIG. 14

| 2 MERCHANT BREACHED IN A BASE | | | |
|---|---|---|---|
| Merchant | top 2_only those bin_exp | top 2_only those bin_exp_values | top_2_anti_sample | values_anti_sample |
| RST | ['RST','DOX'] | [0.097769,0.335772] | [UNIFORMS AND ACC,ABC] | [0.203093,0.401019] |
| ABC | ['ABC','CRK'] | [0.194767,0.381822] | [RST,ABC] | [0.338317,0.372310] |

FIG. 15

| 2 MERCHANT BREACHED IN A BASE | | | | |
|---|---|---|---|---|
| merchant_dba_name | top_2_only_those_bin_exp | values_those_bin_exp | top_2_anti_sample | values_anti_sample |
| RST | ['RST','DEF'] | [0.098287,0.297731] | [GHI,JKL] | [0.203093,0.323721] |
| GHI | ['GHI','JKL'] | [0.290411,0.339808] | [RST,ABC] | [0.193136,0.352982] |

# SYSTEM FOR DETECTION OF ENTITIES ASSOCIATED WITH COMPROMISED RECORDS

BACKGROUND

Millions of stolen credit card records, including bank identification numbers (BINS) and expiration date pairs, are published and/or sold on the dark web every year. However, other information, such as zip codes, names, addresses, and other information are typically not available in the source file for breached records. In such cases, a single BIN and expiration date data pair found on the dark web source file can be matched to dozens, hundreds or even thousands of potentially matching payment card records. This makes identification of breached merchants from which the breached records may have originated inaccurate, resource intensive, and cost prohibitive.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for predictive detection of breached entities associated with compromised records from a breach. A plurality of matching records, each having an identification number and expiration date pair matching an identification number and an expiration date pair of one of a plurality of compromised records associated with a source file, is identified. A set of candidate entities, each having at least one event associated with at least one of the identified plurality of matching records during a time period, are identified. A divergence value representing a distance between a set of probability distribution vectors for a plurality of records stored by each entity in the selected set of candidate entities during the time period is calculated. A set of probability distribution vectors for the plurality of compromised records associated with the source file is calculated. The calculated divergence values are compared to a threshold value. A set of predicted breached entities are identified from the selected set of candidate entities based on the comparison. A notification is sent to notify at least one entity within the identified set of predicted breached entities of the breach and the time period. The notification comprising a recommendation to label the plurality of records stored by the at least one entity as compromised.

BRIEF DESCRIPTION OF THE DRAWINGS

The present description will be better understood from the following detailed description read in light of the accompanying drawings, wherein:

FIG. 8 is an exemplary table illustrating a list of entities sorted into categories from least likely to most likely to be a common point of purchase for compromised records according to an embodiment.

FIG. 13 is an exemplary table illustrating probability distribution vectors for source file records and records associated with events occurring within a selected time period according to an embodiment.

FIG. 14 is an exemplary table illustrating Bhattacharyya divergence values calculated for a set of entities for a selected time period according to an embodiment.

FIG. 15 is an exemplary table illustrating divergence values for a two-entity breach scenario according to an embodiment.

FIG. 16 is an exemplary table illustrating divergence values calculated where two entities are breached in a base according to an embodiment.

Corresponding reference characters indicate corresponding parts throughout the drawings

DETAILED DESCRIPTION

Figure 1:
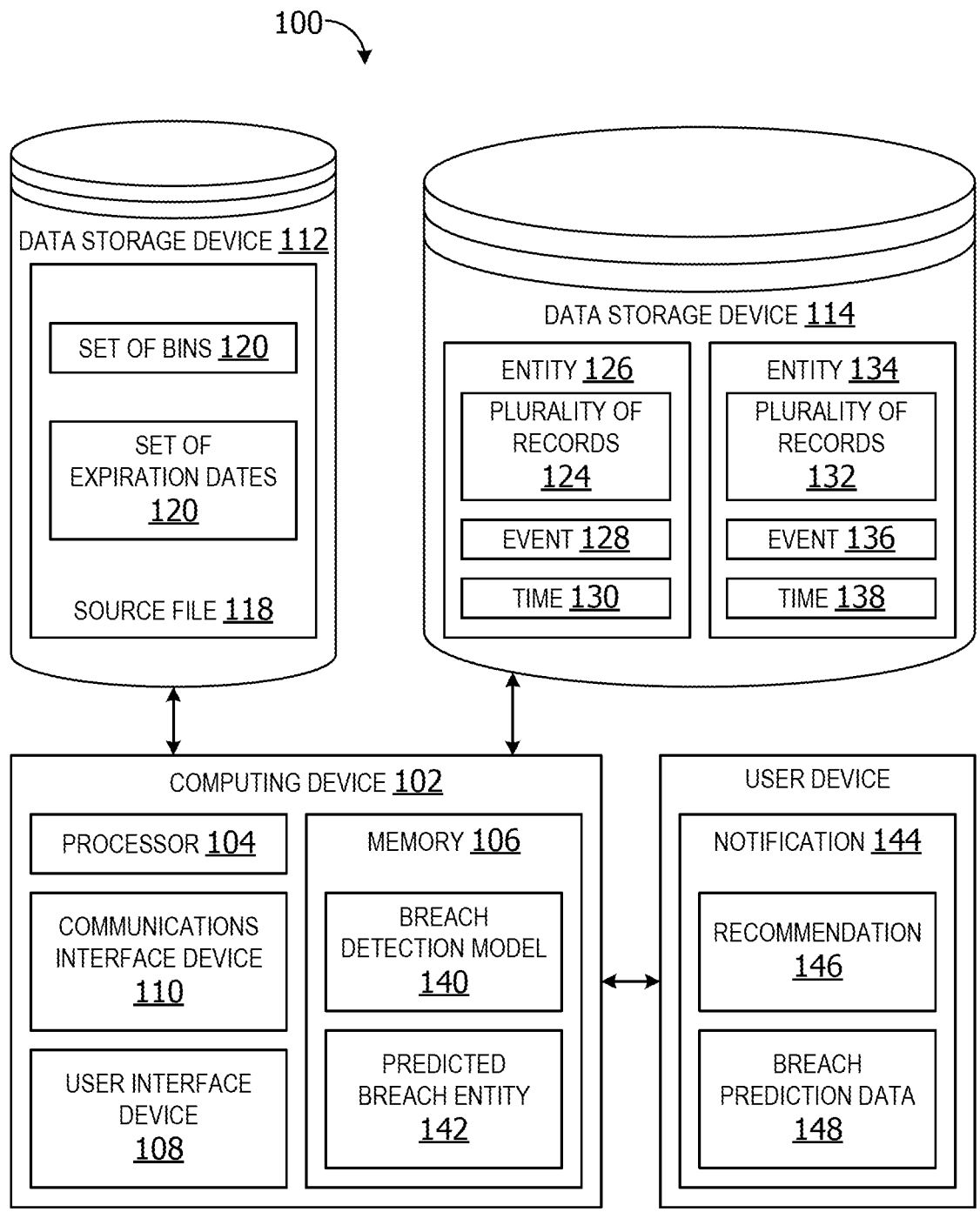
FIG. 1 is an exemplary block diagram illustrating a system configured for early detection of breached entities according to an embodiment.

It is frequently difficult to identify a breached merchant based on payment card information posted on the dark web, until the stolen cards start reporting the fraud. Due to the unreliability of the dark web information, thousands of payment card records may match the dark web file information prior to fraud reporting. In some cases, analysis to identify a breached merchant before fraud is reported is processor intensive and memory intensive, and the results are frequently inaccurate with regard to distinguishing between possible merchant sources of the breach. Moreover, hacker behaviors continually change, making it difficult to localize the source and/or time of an occurrence of a breach.

Currently, identifying merchants that have been hacked and through which customer payment cards, such as debit and credit cards, are being sold online on the dark web, before the payment card owners start reporting fraudulent charges, is difficult, inaccurate, resource intensive and/or extremely problematic due to the unreliable nature of information available on the dark web as well as the lack of information available as to which merchants may have been breached in the recent past.

Aspects of the disclosure provide a computerized method and system for early detection of breached entities using a mathematical relationship in the form of a divergence value calculated between (1) dark web file records associated with compromised cards and (2) records associated with one or more merchants having transactions during selected time periods and further having at least partially matching identification numbers. The described examples provide a previously unknown and unavailable compute-friendly and efficient methodology for comparing dark web file card data distributions with merchant card data distributions using statistical divergence measures.

The system, in some examples, identifies matching payment card accounts having bank identification numbers (BINs) and expiration dates matching compromised records identified in a dark web source file. Divergence values for the source file and the candidate entities are compared to identify predicted breached merchants. This enables more accurate and efficient identification of breached merchants prior to payment card fraud reporting. This enables more effective mitigation and prevention of loss due to the breach.

The identified entity merchants having transactions using the matching payment accounts within a selected time period are filtered to eliminate merchant entities unlikely to be the source of the breach due to the relatively small number of matches between the entity records and the source file. This provides for reduction in the number of entities subject to fraud investigation and improves identification of breached merchants while further reducing time and resources required for fraud detection.

Other examples provide a predictive breach detection model using divergence values to more accurately identify breached merchants based on partial card numbers and expiration date data pairs available in dark web source files prior to fraud reporting. Previously available algorithms, such as breach radar algorithm, take all possible merchants and create a grid between merchant and available fraud cards, which can result in a grid as big as ten million by one hundred thousand, causing memory issues and processing lag-time. In contrast, the breach detection model using divergence calculations, as described herein, compares divergence values rather than creating large grids. This further conserves memory resources and reduces processor load.

In other examples, the system compares divergence values generated using transaction events data during specified time periods and BIN/expiration date data from a source file to predict breached merchants more accurately in an absence of information as to which exact payment cards are the subject of fraud while eliminating or compensating for noise due to uncompromised matching records associated with payment cards which are not the subject of fraud. This enables improved fraud detection efficiency and reduced error rate in identifying breached entities.

Identifying compromised payment card records before users begin reporting fraud associated with those accounts enables issuers and cardholders to be proactively informed. The predictive breach identification further enables improved mitigation for reduction of losses and improved system security.

In some examples, the divergence calculations and comparisons, of some of the examples, is able to pick up 45% of breached merchants in high confidence results and 65% in medium confidence results. These previously went unnoticed and further provides advantages which were not thought of previously or could not be obtained and is possible only due to selection and applicability of the detection methodology of the examples described herein.

In other examples, the system enables identification of breached merchants prior to fraud reporting. This early enactment of mitigation measures, such as notification of breached merchants, notification of cardholders, and/or notification of payment card issuers, further enables faster breach-related communications with impacted entities and reduced response time by cardholders, issuers and/or merchants to potential breach events.

The system, in still other examples, aggregates and/or utilizes transaction information or other transaction-related records from multiple different issuer banks to generate breach predictions dynamically without requesting or remotely accessing such data from multiple different data stores associated with different entities. This reduces network bandwidth usage while improving prediction result accuracy.

FIG. 1 is an exemplary block diagram illustrating a system 100 configured for early detection of breached entities according to an embodiment. In some non-limiting examples, a computing device 102 represents any device executing computer-executable instructions (e.g., as application programs, operating system functionality, or both) to implement the operations and functionality associated with the computing device 102. The computing device 102, in some examples, includes a mobile computing device or any other portable device. A mobile computing device includes, for example but without limitation, a mobile telephone, laptop, tablet, computing pad, netbook, gaming device, and/or portable media player. The computing device 102 can also include less-portable devices such as servers, desktop personal computers, kiosks, or tabletop devices. Additionally, the computing device 102 can represent a group of processing units or other computing devices.

In some examples, the computing device 102 has at least one processor 104 and a memory 106. The computing device 102 in other examples includes a user interface device 108. The processor 104 includes any quantity of processing units and is programmed to execute computer-executable instructions the processor 104. In some examples, the processor 104 is programmed to execute instructions such as those illustrated in the figures (e.g., FIG. 9, FIG. 10, and FIG. 11).

The memory 106 includes any quantity of media associated with or accessible by the computing device 102. The memory 106, in these examples, is internal to the computing device 102 (as shown in FIG. 1). In other examples, the memory 106 is external to the computing device (not shown) or both (not shown). The memory 106 stores data, such as one or more applications. The applications, when executed by the processor 104, operate to perform functionality on the computing device 102. The applications can communicate with counterpart applications or services such as web services accessible via a network. In an example, the applications represent downloaded client-side applications that correspond to server-side services executing in a cloud.

In other examples, the user interface device 108 includes a graphics card for displaying data to the user and receiving data from the user. The user interface device 108 can include a display (e.g., a touch screen display or natural user interface) and/or computer-executable instructions (e.g., a driver) for operating the display. The user interface device 108 can also include one or more of the following to provide data to the user or receive data from the user: speakers, a sound card, a camera, a microphone, a vibration motor, one or more accelerometers, a BLUETOOTH® brand communication module, global positioning system (GPS) hardware, and a photoreceptive light sensor. In a non-limiting example, the user inputs commands or manipulates data by moving the computing device 102 in one or more ways.

The network may be implemented by one or more physical network devices, such as, but without limitation, routers, switches, network interface cards (NICs), and other network devices. The network may be any type of network for enabling communications with remote computing devices, such as, but not limited to, a local area network (LAN), a subnet, a wide area network (WAN), a wireless (Wi-Fi) network, or any other type of network. In this example, the network is a WAN, such as the Internet. However, in other examples, the network may be a local or private LAN.

In some examples, the system 100 optionally includes a communications interface device 110. The communications interface device 110 includes a network interface card and/or computer-executable instructions (e.g., a driver) for operating the network interface card. Communication between the computing device 102 and other devices, such as but not limited to the data storage device 112, the data storage device 114 and/or the user device 116, can occur using any protocol or mechanism over any wired or wireless connection. In some examples, the communications interface device 110 is operable with short range communication technologies such as by using near-field communication (NFC) tags.

The user device 116 represents any computing device executing computer-executable instructions. The user device 116 can be implemented as a desktop computer, a server, a mobile computing device, or any other type of computing device. The user device 116 includes at least one processor and a memory. The user device 116 can optionally also include a user interface device.

The data storage device 112 and/or the data storage device 114 can include one or more different types of data storage devices, such as, for example, one or more rotating disks drives, one or more solid state drives (SSDs), and/or any other type of data storage device. The data storage device 112 and/or the data storage device 114 in some non-limiting examples includes a redundant array of independent disks (RAID) array. In other examples, the data storage device 112 and/or the data storage device 114 includes a database.

The data storage device 112 and/or the data storage device 114 may be included within the computing device 102 (not shown), attached to the computing device 102, plugged into the computing device or otherwise associated with the computing device 102. In other non-limiting examples, the data storage device 112 and/or the data storage device 114 includes a remote data store, as shown in FIG. 1, accessed by the computing device via the network. A remote data store may include one or more remote data storage devices, a data store associated with a remote data center, and/or a cloud storage.

The data storage device 112 in some examples stores data associated with one or more source files, such as, but not limited to, the source file 118. The source file 118 is a source file containing one or more compromised records obtained from a source, such as, but not limited to, the dark web. A compromised record refers to a payment card record, such as, but not limited to, a credit card, a debit card, a gift card, a check card, or any other type of payment card.

The source file 118 includes a set of one or more BINs and a set of one or more expiration dates 122. A BIN number is the initial four to six numbers on a payment card identification number that identifies the issuer of the payment card. Each unique issuing bank has a corresponding unique BIN number.

Each BIN number in the set of BINs 120 is a BIN associated with a compromised record. An expiration date in the set of expiration dates 122 corresponds to at least one BIN. Thus, in some examples, each compromised record includes a BIN and expiration date data pair associated with the payment card represented by the compromised record.

The source file 118 may include any number of BINs associated with any number of issuers. The source file 118 may include anywhere from a single BIN to hundreds or thousands of BINs. The BINs in the source file may represent BINs from payment cards from a single issuer bank, as well as BINs for two or more issuer banks. In other words, card numbers put on the dark web could belong to any number of issuers. A single source file could include BINs from seven different issuer banks or any other number of issuers.

The data storage device 114, in some examples, includes a plurality of records associated with one or more entities using the records during an event taking place within a given time frame. The data storage device 114 may store data associated with transactions for payment cards issued by a single issuer bank, as well as records for transactions for payment cards issued by multiple different issuer banks.

In some examples, a record in the plurality of records 124 records an event 128, such as a transaction for purchase of goods or services utilizing a payment card account provided by a customer. The record includes the BIN, expiration date, cardholder name, issuer, time of transaction, location of transaction, as well as any other related information. In this non-limiting example, the plurality of records 124 includes records for transactions completed with the same merchant entity during a selected time period. The selected time period can include any period of time, such as, but not limited to, a time span of lasting a period of minutes, hours, days, weeks, months or even years.

Likewise, the plurality of records 132 includes one or more records recording data associated with one or more transaction events 136 completed during a selected time 138 period by a selected entity 134. The entity 134 may be any type of entity, such as a person, business entity, organization, etc. In this example, the entity 134 is a merchant.

Each record in the plurality of records 132 includes at least a set of BINs and a set of expiration dates corresponding to the payment card accounts utilized to complete each transaction.

In this example, the computing device 102 accesses source file data stored on the data storage device 112 via a network. The computing device 102 likewise accesses record data associated with transaction data of payment cards of one or more different issuer banks stored on the data storage device 114 via the network. However, in other examples, the source file 118 and the plurality of records associated with each entity may be stored on the same data storage device. In still other examples, the source file and the plurality of records for each entity may be stored on a data storage device on the computing device 102. In these examples, the data may be obtained without a network connection.

In the example shown in FIG. 1, the plurality of records for a first entity 126 and a plurality of records 132 for the second entity 134 are stored on the data storage device 114. However, the examples are not limited to records for only two entities. In other examples, the data storage device 114 can store records for any number of entities. For example, the data storage device can store records for a single entity, as well as store records for three or more entities.

The memory 106, in some examples, stores a breach detection model 140. The breach detection model 140 compares the set of BINs 120 and the set of expiration dates 122 with the plurality of records 124 and the plurality of records 132. The breach detection model 140 identifies a plurality of matching records each having an identification number and expiration date pair matching a BIN number and expiration date pair of one of a plurality of compromised records associated with the source file 118. The breach detection model 140 selects a set of candidate entities having at least one event associated with at least one of the identified plurality of matching records during a time period.

In some examples, the system creates BIN/expiry distribution vectors for each time period and each merchant entity and source file. The probability distribution vectors are non-negative entries which add up to a value of one. The positions of the probability vector represent potential different outcomes of discrete random variables.

The breach detection model calculates a divergence value is a vector operator representing a distance between a set of probability distribution vectors for a plurality of records stored by each entity in the set of candidate entities during the time period and a set of probability distribution vectors for the plurality of compromised records.

The divergence value in some examples is a Bhattacharya distance calculated using a Bhattacharyya coefficient which measures the amount of overlap between two statistical samples. In other words, the Bhattacharyya distance measures the similarity between the probability distributions of the records in the source file and the records for a candidate entity during a selected time period in accordance with the following equation:

$$DB(p,q) = -\ln(\Sigma \times \sqrt{p(x)q(x)})$$

The Bhattacharyya divergence value indicates whether the distribution of leaked card data is statistically similar to the distribution of breached merchant's card data during the selected time period. The BIN and expiry date combination distribution at every merchant is compared with the distribution of the dark web file. The merchant or set of merchants with the distribution closest to the dark web file distribution is selected.

In other examples, the system calculates a Kullback-Liebler (KL) divergence between the two sets of probability distribution vectors, using the following equation:

$$D_{KL}(p, q) = -\sum_{x \in X} p(x) \log\left(\frac{q(x)}{p(x)}\right)$$

The KL divergence is determined by applying the KL algorithm and normalizing both vectors to be sure they are distributions. The KL divergence is a distance measure of two discrete probability histograms.

In still other examples, the breached entity is identified using a fractional distance metrics algorithm, a graph-based distance method and/or an auto-encoder hidden representation distance.

The breach detection model compares the calculated divergence values to a threshold value. In these examples, if the divergence value is less than the threshold value, the merchant is a predicted breached merchant. In other examples, the breach detection model selects a merchant as a predicted breached merchant if the divergence value for the merchant is smaller or less than a pre-defined threshold value.

In still other examples, the breach detection model identifies an entity as the predicted breached entity if the calculated divergence value is less than an average of the calculated divergence values.

In yet other examples, if a calculated divergence value is an outlier when compared to other divergence values for other candidate entities, the entity associated with the outlier divergence value is identified as the predicted breached entity. In still other examples, the system selects the merchant entity having a divergence value indicating that the records for that merchant are the most similar or closest to the source file data.

The breach detection model identifies at least one predicted breached entity 142 from the selected set of candidate entities based on the comparison. The breach detection model generates a notification 144 notifying the predicted breached entity 142.

In some examples, the notification 144 is transmitted to a user device 116 associated with the breached entity and/or a cardholder associated with the compromised record. The notification 144 optionally includes a recommendation 146 for mitigating the negative impact of the predicted breach. The recommendation may include a recommendation to label the compromised records as breached, inform the breached merchant, inform the issuers of compromised accounts associated with the breach, cancel one or more payment accounts associated with the compromised records, a recommendation to notify a payment cardholder, etc.

The notification may optionally also include breach prediction data 148. The breach prediction data 148 optionally includes complete identification numbers for the compromised accounts, cardholder names, cardholder addresses, predicted time period of breach occurrence, breached entity identification, or any other breach-related data.

In this non-limiting example, the breach detection model 140 is implemented on a computing device 102. In other examples, the breach detection model 140 is implemented within a cloud server. The cloud server may be a logical server providing services to the computing device 102 or other clients, such as, but not limited to, the user device 116. The cloud server is hosted and/or delivered via a network. In some non-limiting examples, the cloud server is associated with one or more physical servers in one or more data centers. In other examples, the cloud server is associated with a distributed network of servers.

In this manner, the system identifies merchants that have been hacked and through which payment cards are being sold online in the dark web before card holders start reporting fraud. The system is a compute friendly, efficient methodology that compares dark web distribution with merchant distributions using statistical divergence measures.

The system, in some examples, picks up forty-five percent of breached merchants in top 10 and sixty-five percent in top 45 of the results, which previously went unnoticed. This enables identification of breached merchants before the stolen cards start reporting fraud.

In the example shown in FIG. 1, a single breached merchant is identified based on the divergence values. However, in other examples, the BINS in a source file may have been obtained from two or more breached merchants. In such cases, the system can identify a combination of two or more breached merchants as the predicted breached entities associated with a given source file. In other words, a predicted breached merchant for a given source file may be a single merchant, a group of two merchants breached, or a group of three or more merchants.

In other examples, if the system cannot narrow down the field of possible candidate merchants for a breach down to one or two merchants, the system eliminates as many unlikely merchants from the set of candidate merchants as possible. The remaining set of candidate merchants are handed off to fraud investigations for additional fraud detection. In this manner, the system narrows the field from all possible merchants to a set of likely candidate merchants which may be the source of the stolen card numbers in a dark web source file. This enables improved fraud detection and reduces resources usage necessary to identify a breached merchant prior to fraud reporting.

Figure 2:
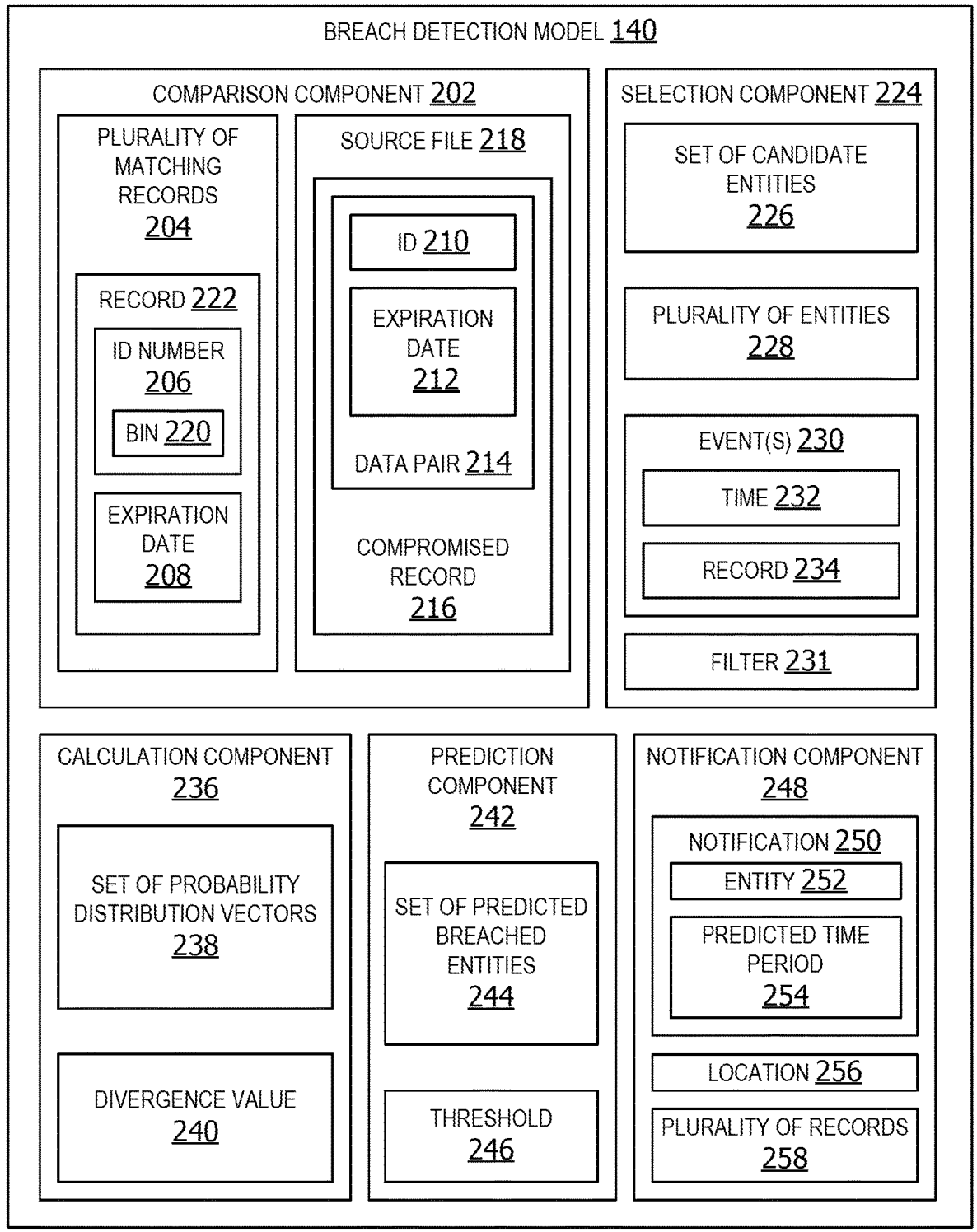
FIG. 2 is an exemplary block diagram illustrating a breach detection model for generating breached entity predictions according to an embodiment.

FIG. 2 is an exemplary block diagram illustrating a breach detection model 140 for generating breached entity predictions according to an embodiment. In some examples, a comparison component 202 is a processor programmed to execute computer-executable instructions, and the instructions are as follows: identify a plurality of matching records 204, each record 222 having an identification number 206 and expiration date 208 pair matching an identification (ID) 210 number and an expiration date 212 data pair 214 of one of a plurality of compromised records, such as the compromised record 216 obtained from a source file 218. The source file 218 is a file including one or more compromised records obtained from the dark web, such as, but not limited to, the source file 118 in FIG. 1.

The ID number 206 is an identification number associated with a record recording a transaction event completed by a user using a payment card or a payment account. The BIN 220 is a number identifying an issuer of the payment card or payment account. The expiration date 208 is a date of expiry for the payment account.

In some examples, a selection component 224 is a processor programmed to execute computer-executable instructions, and the instructions are as follows: select a set of candidate entities 226. Each candidate entity in the set of one or more candidate entities has at least one transaction event associated with at least one of the records matching a compromised account during a time period. In this example, the set of candidate entities 226 are selected from a plurality of entities 228. The plurality of entities 228 includes two or more merchant entities having available transaction events for analysis by the breach detection model 140.

The event(s) 230 include one or more transaction events associated with a purchase, order or prepayment for goods or services. The event(s) 230 record 234 occurs at a time 232. If the time 232 falls within the selected time period and the record identification number matches the BIN 220 and expiration of a record in the source file, the record 234 may be identified as a matching record.

In some examples, each candidate in the set of candidate entities 226 is a merchant entity which has at least one record 234 of a transaction event occurring at a time 232 which is within a selected time range completed using a payment card number which at least partially matches an ID 210, such as a BIN, and/or expiration date of a compromised record in the source file.

The selection component 224, in other examples, applies a filter 231 algorithm to filter the matching records and/or filter the candidate entities to reduce the number of entities in the set of candidate entities 226. In some example, the filter 231 is performed based on an adjustable and dynamic filter threshold value. The filter, in other examples, removes any candidate entities having a number of transactions using cards with numbers matching source file records that is below a threshold number or a threshold percentage. For example, if the number of records for a given candidate entity matching BINs of the source file is less than thirty percent, those entities are eliminated.

In other examples, if the number of entities in the set of candidate entities 226 prior to filtering is less than a threshold number, the system does not filter the candidate entities from the set of selected candidate entities. In other words, filtering is only performed if the number of candidate entities exceeds a certain threshold number.

A calculation component 236 is a processor programmed to execute computer-executable instructions, and the instructions are as follows: generate a set of probability distribution vectors 238 for the plurality of matching records 204 and the records in the source file 218 and calculate divergence values between the source file and the candidate merchants.

In some examples, the calculation component 236 generates a first set of probability distribution vectors for the plurality of compromised records in the source file, a second set of probability distribution vectors for the plurality of records associated with a first candidate entity, a third set of probability distribution vectors for the plurality of records for a second candidate entity, a fourth set of probability distribution vectors for the plurality of records for a third candidate entity, etc.

The calculation component 236 calculates a divergence value 240 representing a distance between a set of probability distribution vectors for a plurality of records stored by each entity in the set of candidate entities during the time period and a set of probability distribution vectors for the plurality of compromised records. In other words, the calculation component 236 calculates a first divergence distance value between the first set of probability distribution vectors for the source file 218 and the set of probability distribution vectors for the first candidate entity. The calculation component then calculates a second divergence distance value between the set of probability distribution vectors for the source file and the set of probability distribution vectors for the second candidate entity. In some examples, the calculation component further generates a divergence value between the set of probability distribution vectors for the source file and the set of probability distribution vectors for the third candidate entity, etc.

In some examples, a prediction component 242 is a processor programmed to execute computer-executable instructions, and the instructions are as follows: compare the calculated divergence values, such as divergence value 240, to a threshold value 246 and identify a set of one or more predicted breached entities 244 from the selected set of candidate entities based on the comparison.

In other examples, the prediction component 242 compares the divergence values between the source file and each candidate entity. The prediction component selects the candidate entity with the shortest distance (lowest divergence value) from the source file. The shortest distance value indicates the records for the selected candidate entity are the most similar to (or least different from) the records in the source file.

A notification component 248 is a processor programmed to execute computer-executable instructions, and the instructions are as follows: generate a notification 250 associated with the set of predicted breached entities. In some examples, the notification is sent to each breached entity in the set of predicted breached entities, the issuer of every payment card used in a transaction with the predicted breached entity during the predicted time period of the breach, and/or the cardholder of each payment card used in such transactions with the breached merchant.

The notification 250, in some examples, includes an identification of the breached entity 252, the predicted time period 254 during which the breach occurred, location 256 of the merchant entity, location of the breach occurrence, and/or identification of the plurality of records 258 associated with the breach. The plurality of records include identification of the records compromised by the breach.

The notification is transmitted to the entity 252 via a communications interface device, such as, but not limited to, the communications interface device 110 in FIG. 1. The notification may optionally also include a recommendation to label the plurality of records stored by the at least one entity as compromised.

The notification may be provided to an issuer, merchant and/or cardholder via an email, a text message alert, a printed letter, a phone call, or any other type of notification. In other examples, the notification is output to a user via a user interface on a computing device, such as, but not limited to, a display screen, a touch screen, etc. The notification may also include an alert, an audible alarm, or other output.

The breach detection model 140 optionally includes a machine learning model. The machine learning model may include pattern recognition, breach prediction modeling, or other machine learning algorithms to analyze sensor data and/or database information to generate alerts, including notifications and/or instructions, trends, and/or other patterns associated with a possible breach. In some examples, the machine learning compares divergence values for various candidate entities to identify one or more predicted breached entities.

In other examples, the machine learning uses examples of older dark web file uploads to perform fraud analysis. The system performs analysis on identified merchants to detect whether they were in fact common points of purchase. This provides a compute friendly solution which runs the solution for all possible combinations of the time ranges before the upload date. The system obtains the vector with the lowest divergence. The breached entity prediction results generated based on comparison of the generated divergence values is compared with the known breached merchants for the older dark web file uploads to fine-tune and improve the machine learning predictive analysis. The system may also utilize feedback from users to fine-tune the analysis.

Figure 3:
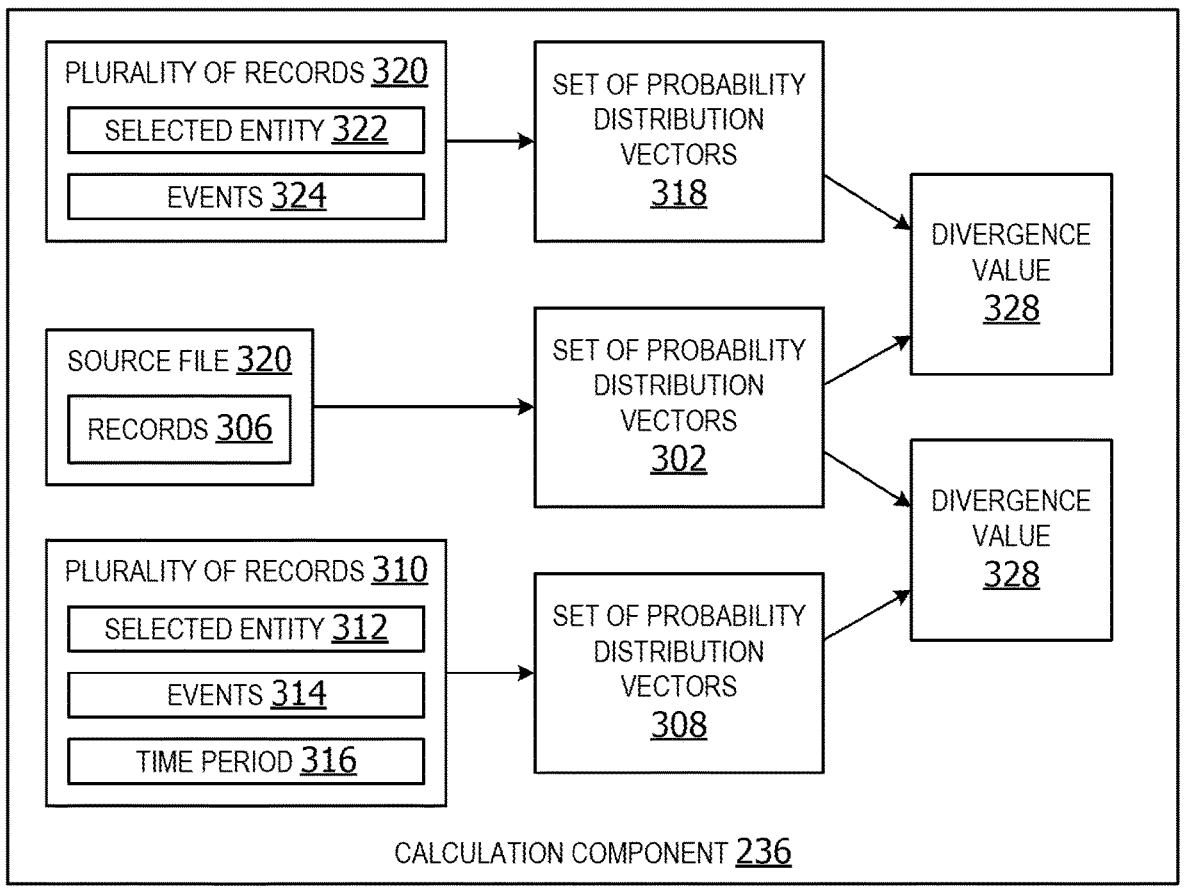
FIG. 3 is an exemplary block diagram illustrating a calculation component for generating divergence values used to identify potentially breached entities according to an embodiment.

FIG. 3 is an exemplary block diagram illustrating a calculation component 236. In some examples, the calculation component 236 is a processor programmed to execute computer-executable instructions, and the instructions are as follows: generating divergence values used to identify potentially breached entities according to an embodiment. In some examples, the calculation component 236 generates a first set of probability distribution vectors 302 for a plurality of compromised records 306 obtained from a source file 304. The source file 304, in this non-limiting example, is a dark web file obtained from the dark web. The source file 304 is a file such as, but not limited to, the source file 118 in FIG. 1 and/or the source file 218 in FIG. 2.

The calculation component 236 generates a second set of probability distribution vectors 308 for a first plurality of records 310 stored by a first entity 312 and having transaction events 314 associated with records matching at least one record from the source file during a first time period 316. The calculation component 236 generates a third set of probability distribution vectors 318 for a second plurality of records 320 stored by a second entity 322 selected from the set of candidate entities during the first time period 316. The plurality of records 320 are records used in transaction events 324 during the time period 316 and matching compromised records 306 from the source file 304.

The calculation component 236 calculates a first divergence value 326 representing a distance between the first set of probability distribution vectors 302 and the second set of probability distribution vectors 308. The calculation component 236 calculates a second divergence value 328 representing a distance between the first set of probability distribution vectors 302 and the third set of probability distribution vectors 318.

In some examples, the first entity is selected as a predicted breached entity on condition the first divergence value 326 is less (shorter distance) than the second divergence value 328. The breach detection model selects the second entity 322 as the predicted breached entity on condition the second divergence value 328 is less than the first divergence value 326.

In the example shown in FIG. 3, three set of probability distribution vectors are calculated. However, in other examples, four or more sets of probability distribution vectors are calculated for three or more candidate entities. Likewise, in this example, two divergence values are calculated. However, the examples are not limited to two divergence values. In other examples, three or more divergence values are calculated between the first set of probability distribution vectors and the probability distribution vectors for three or more candidate entities.

Figure 4:
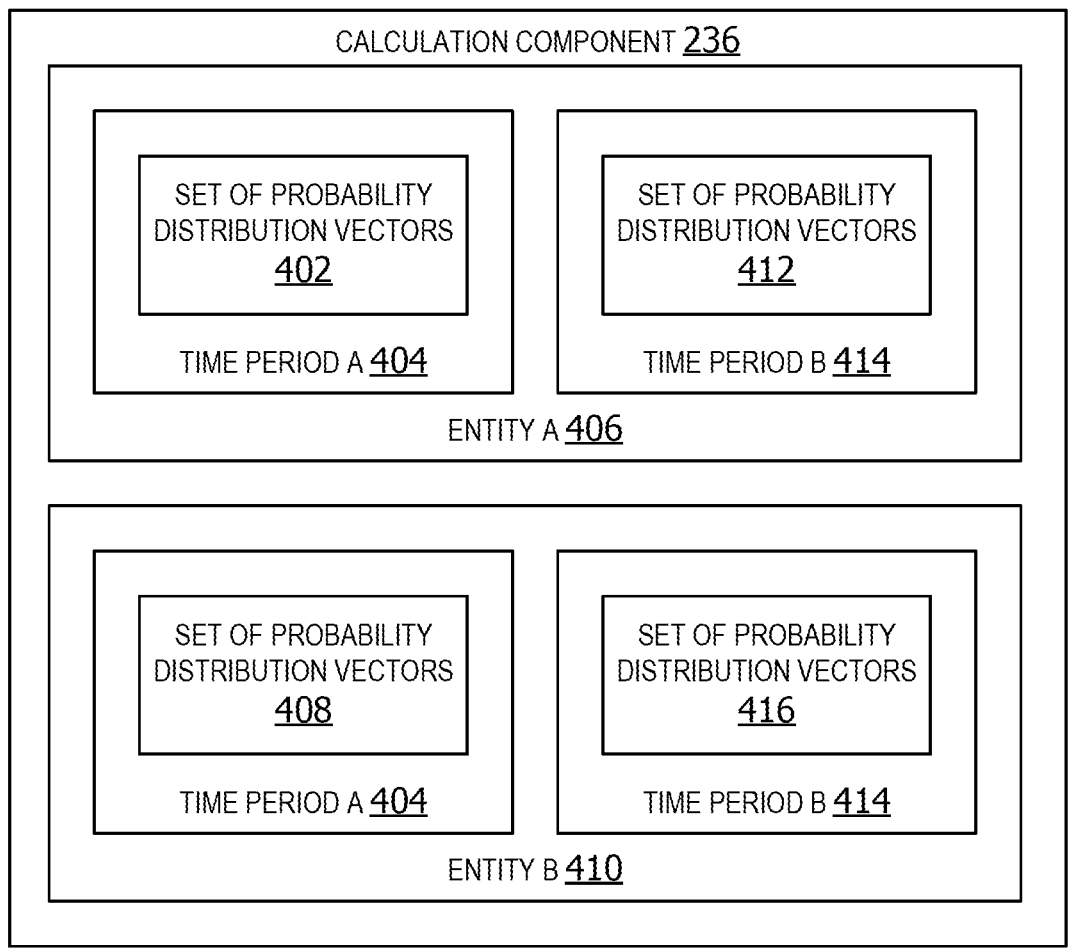
FIG. 4 is an exemplary block diagram illustrating a calculation component for generating probability distribution vectors for entities across various time periods according to an embodiment.

FIG. 4 is an exemplary block diagram illustrating a calculation component 236 for generating probability distribution vectors for entities across various time periods according to an embodiment. In this non-limiting examples, the calculation component 236 generates a first set of probability distribution vectors 402 for a first entity 406 records associated with events during a first time period A 404. The calculation component 236 further calculates a first set of probability distribution vectors 408 for the first time period A 404 associated with a second entity B 410.

The calculation component 236 generates a set of probability distribution vectors 412 for a second time period B 414. The calculation component 236 generates a second set of probability distribution vectors 416 for the second time period B 414 associated with entity B 410.

In this example, a new set of probability vectors is generated using records involved in events occurring during each different time period for each candidate entity. In this example, probability vectors are generated for two entities during two different time periods. However, the examples are not limited to generating probability vectors for only one or two time periods. In other examples, probability distribution vectors are generated for three or more different time periods before a single predicted time period is identified by the prediction component based on the results of the probability distribution calculations.

In this example, probability distribution vectors are generated for two candidate entities, entity A 406 and entity B 410. In other examples, the calculation component 236 generates probability distribution vectors and/or divergence values for three or more entities.

Figure 5:
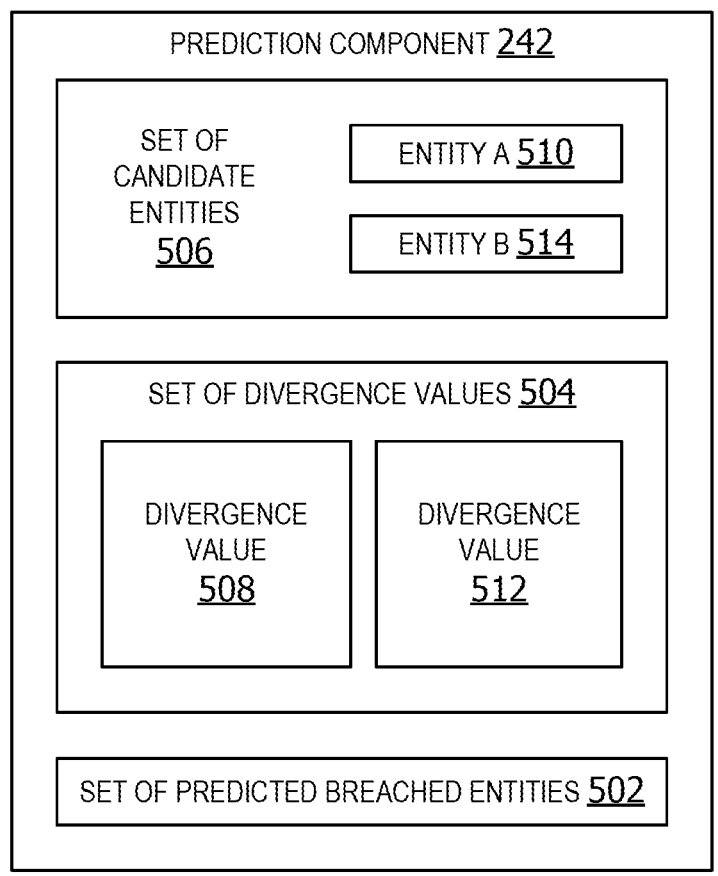
FIG. 5 is an exemplary block diagram illustrating a prediction component identifying predicted breached entities according to an embodiment.

FIG. 5 is an exemplary block diagram illustrating a prediction component 242 identifying predicted breached entities according to an embodiment. In some examples, the prediction component 242 identifies a set of predicted breached entities 502 based on an analysis of a set of divergence values 504 for a set of candidate entities 506. In this example, the prediction component 242 compares a divergence value 508 between a source file and an entity A 510 with a divergence value 512 representing the distance between the source file and another entity B 514. In this non-limiting example, if the divergence value 508 is less than the divergence value 512, the prediction component 242 identifies entity A 510 as the predicted breached entity. However, if the divergence value 512 is less than the divergence value 508, the prediction component 242 identifies the entity B 514 as the predicted breached entity.

Figure 6:
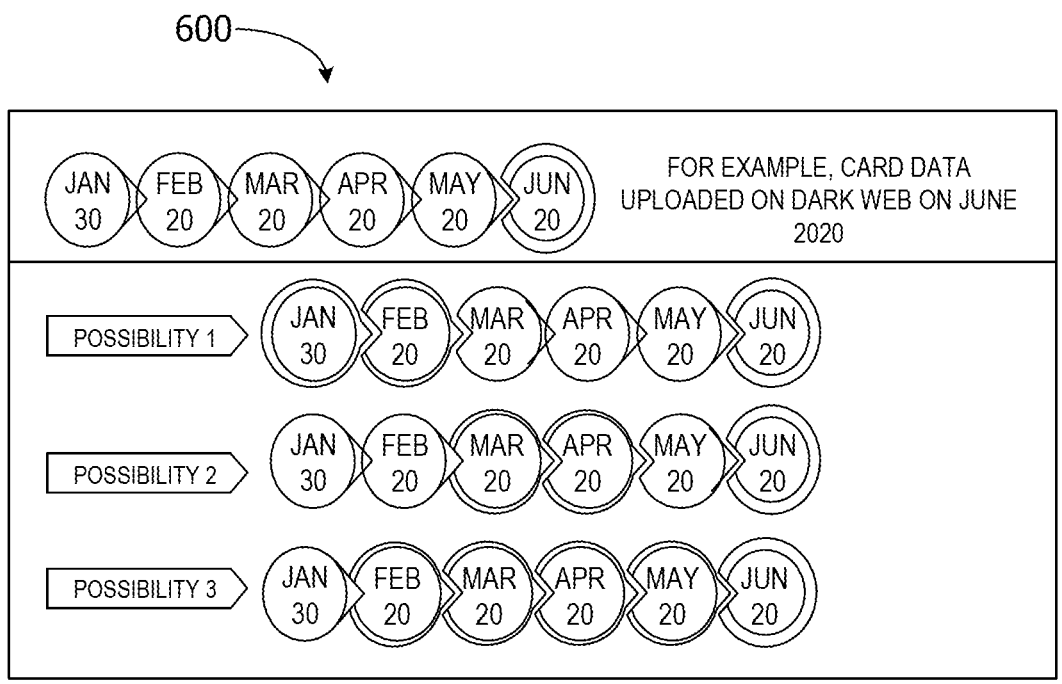
FIG. 6 is an exemplary block diagram illustrating a set of possible time periods according to an embodiment.

FIG. 6 is an exemplary block diagram illustrating a set of possible time periods 600 according to an embodiment. The time periods are time periods during which the breach may have occurred. The time periods include one or more time periods prior to the date and/or time at which the source file was initially uploaded to the dark web or otherwise available on the dark web.

In some examples, the breach detection model analyzes the set of probability distribution vectors for various time periods to identify the time period during which a breach is most likely to have occurred. In this example, a first possibility includes breach occurrence during a two-month period including the months of January and February. A second possibility includes a two-month period of March and April. A third possibility includes a four-month period. However, the examples, are not limited to these time periods. In other examples, the time period for predicted breach occurrence may be a single month, a three-month time-period, a five-month time period, a six-month time period, or any other time period.

Figure 7:
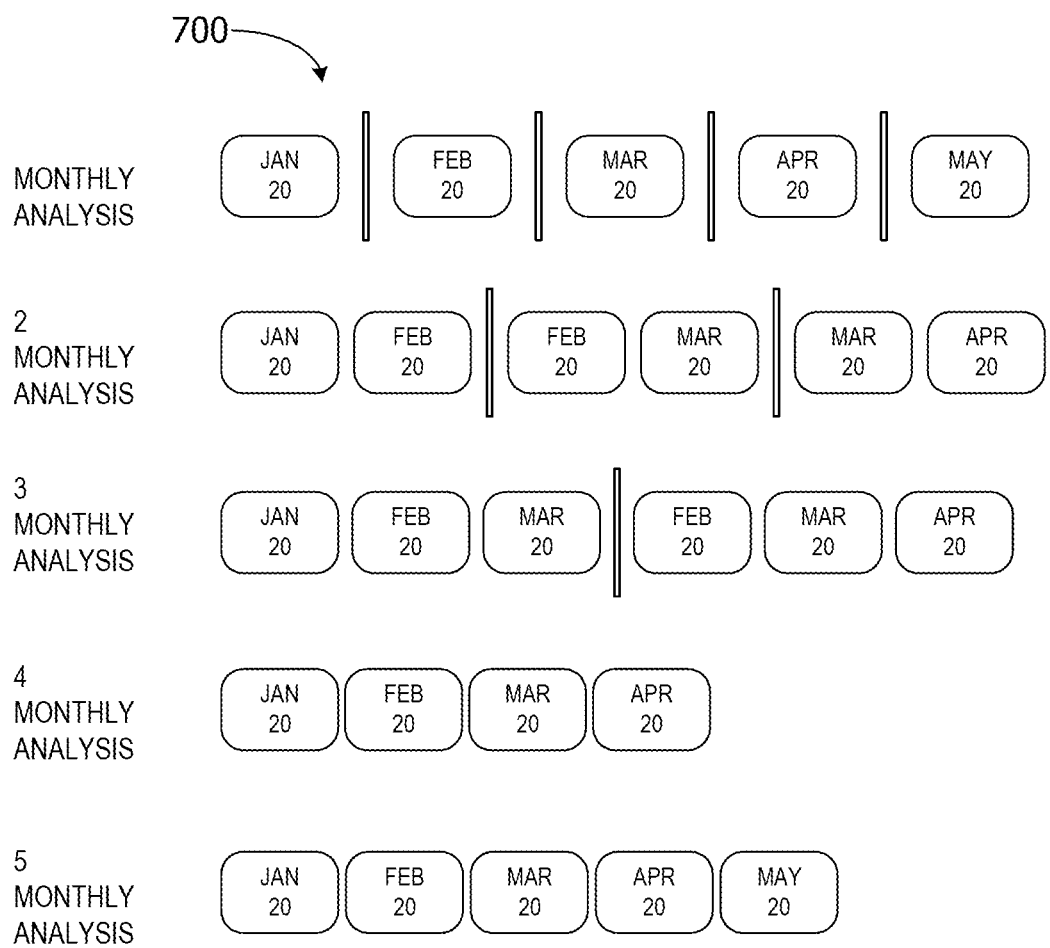
FIG. 7 is an exemplary block diagram illustrating potential time periods for occurrence of a breach associated with compromised records in a source file according to an embodiment.

FIG. 7 is an exemplary block diagram illustrating potential time periods 700 for occurrence of a breach associated with compromised records in a source file. The potential time periods are time intervals or durations of time prior to initial upload of the source file to the Internet or other network.

In some examples, the breach detection model performs a monthly analysis of records associated with events occurring during a one-month time period. In other examples, the breach detection model performs a two-monthly analysis, a three-monthly analysis, a four monthly analysis and/or a five-monthly analysis of records associated with candidate entities.

FIG. 8 is an exemplary table 800 illustrating a list of entities sorted into categories from least likely to most likely to be a common point of purchase for compromised records. In the list of merchant entities are sorted by most likely to least likely contender of common point of purchase (CPP) from the detection model for the top 3 merchants. The top one category means that the actual breached merchant is at the top of the list. Top 10 means that the breached merchant comes in the top 10 of the list of merchants.

In some examples, in top 1 category, the false positive rate is three percent. The breach detection model provides these 15% cases with high confidence since, in such cases, the difference between the Bhattacharya values of the top 2 merchants is significant, where the Bhattacharya divergence values for the top merchant is 0.07357628, the Bhattacharya divergence value for the second top merchant is 0.210426303 and the Bhattacharya divergence value for the top third merchant is 0.240746128. As shown here, when the distance between the top divergence value and the next lowest divergence value is a large distance, then we have a very high confidence in the prediction that the top merchant has been breached.

In other examples, the top 10, top 25, top 50, and top one-hundred (100) merchants are providing the breached merchant within these groups. These results are typically manually validated to check for the breached one. From a possibility of around one hundred thousand to one million merchants, this is a significant reduction in the number of candidate merchants for evaluation in fraud detection.

In some non-limiting examples, the system generates a confidence score. The confidence score indicates a level of confidence associated with each breach merchant prediction and/or each predicted time period during which potential breach is believed to have occurred. A high score indicates a higher confidence that the predicted breached merchant is in fact breached. A lower confidence score indicates less confidence in the prediction. If the predicted merchant(s) have a low confidence score, the system may refer the prediction to fraud investigation personnel or recommend fraud investigation continue to further narrow the field of potential merchants which may have been breached or attempt to improve accuracy of the prediction.

The confidence score may include any type of scoring scale or methodology. In some non-limiting examples, the score is a score of one to ten, where a score of ten indicates a high degree of certainty the predicted breached merchant is breached, with a value of one indicated a very low confidence in the predicted merchants. In still other examples, a score may be a percentage value, a ranking, a number range, a scale, a confidence score label, or any other type of scoring method. A label can optionally include a label of "high confidence", "medium confidence" or "low confidence" appended to each breached merchant prediction.

In other examples, the confidence score is generated during breach assessment and adjusted over time based on additional data, such as combining two data sets into one, updated transaction data received, user-provided feedback, analysis of training data to improve breach assessment, or any other updates enabling improved prediction accuracy and alterations in confidence levels associated with each prediction.

Figure 9:
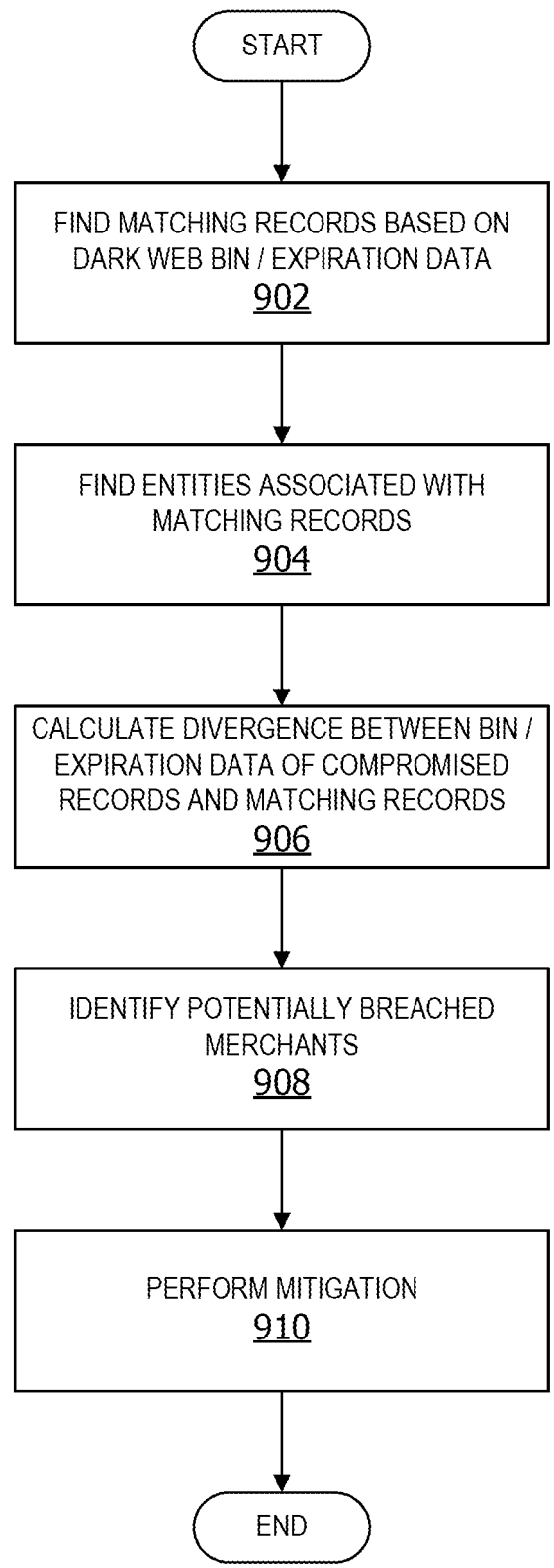
FIG. 9 is an exemplary flow chart illustrating a method of early detection of entities associated with a breach according to an embodiment.

FIG. 9 is an exemplary flow chart illustrating a method of early detection of entities associated with a breach. It should be understood that the method 900 as described may be implemented and/or executed by one or more parts of a system such as systems 100 described above with respect to FIG. 1, FIG. 2, and FIG. 3.

At 902, the breach detection models finds matching records based on dark web BIN and expiration data at 902. The records are records associated with transaction events completed using a payment card account. The breach detection model finds merchant entities associated with matching records at 904. In some examples, a matching entity must have a minimum threshold number of matches. For example, if a merchant only has a single matching record, that merchant is not identified as a matching record because the number of matches are too small.

The breach detection model calculates a divergence between the BIN and expiration data pairs of the compromised records in the source file and the matching records for the candidate entities at 906. At 908, the breach detection model identifies potentially breached entities based on the analysis of the divergence values for the various candidate entities. The breach detection model performs mitigation at 910. The mitigation actions can include sending a notification to a predicted breached entity, sending a notification to a cardholder or account holder associated with the owner of a breached account, labeling records as breached records, or any other action tending to mitigate losses or risks due to breached financial records as a result of unauthorized access to merchant transaction records.

Figure 10:
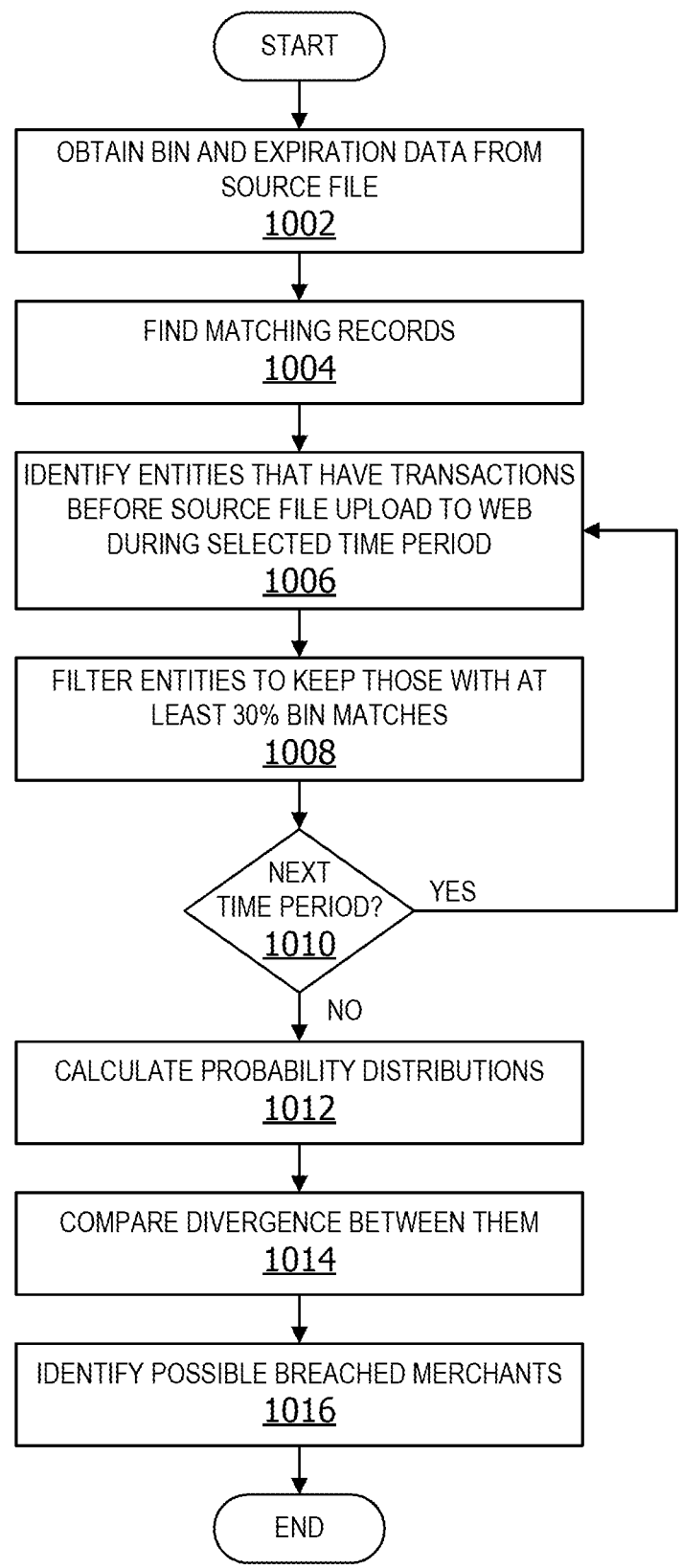
FIG. 10 is an exemplary flow chart illustrating a method of calculating probability distribution vectors for entities across various potential time periods according to an embodiment.

FIG. 10 is an exemplary flow chart illustrating a method of calculating probability distribution vectors for entities across various potential time periods. It should be understood that the method 1000 as described may be implemented and/or executed by one or more hardware processors and/or other components of a system such as systems 100 described above with respect to FIG. 1, FIG. 2, and FIG. 3.

At 1002, the breach detection model obtains BIN and expiration data from a source file at 1002. The source file is a dark web file, such as the source file 118 in FIG. 1 and/or the source file 218 in FIG. 2. Matching records are found at 1004 by matching the BIN and expiration data with the identification numbers and expiration data for merchant entity records during a selected time period occurring before the source file was uploaded to the dark web.

Entity merchants that have transaction events by payment cards represented in the matching records before the source file upload to the web during the selected time period is identified at 1006. The entities are filtered to keep those with at least thirty percent BIN matches at 1008. In other words, any entity that has transactions using payment card identification numbers which match up to less than thirty percent of the BIN numbers in the source file are eliminated in this non-limiting example. In other examples, the entities may be filtered using a different valuer than thirty percent. For example, entities may be filtered if they have less than ten percent matches. In other examples, the filter threshold may be fifteen percent, twenty percent, forty percent, or any other value. In still other examples, if the number of merchants is less than a threshold number, the filtering step is not performed.

The breach detection model determines if there is a next time period for analysis at 1010. If yes, the breach detection model iteratively executes operations 1006 through 1010. If there is no additional time period to analyze, the breach detection model calculates probability distributions at 1012. The breach detection model compares divergence between the probability distributions at 1014. Possible breached merchants are identified at 1016 based on the comparison of the probability distribution divergence values. The process terminates thereafter.

Figure 11:
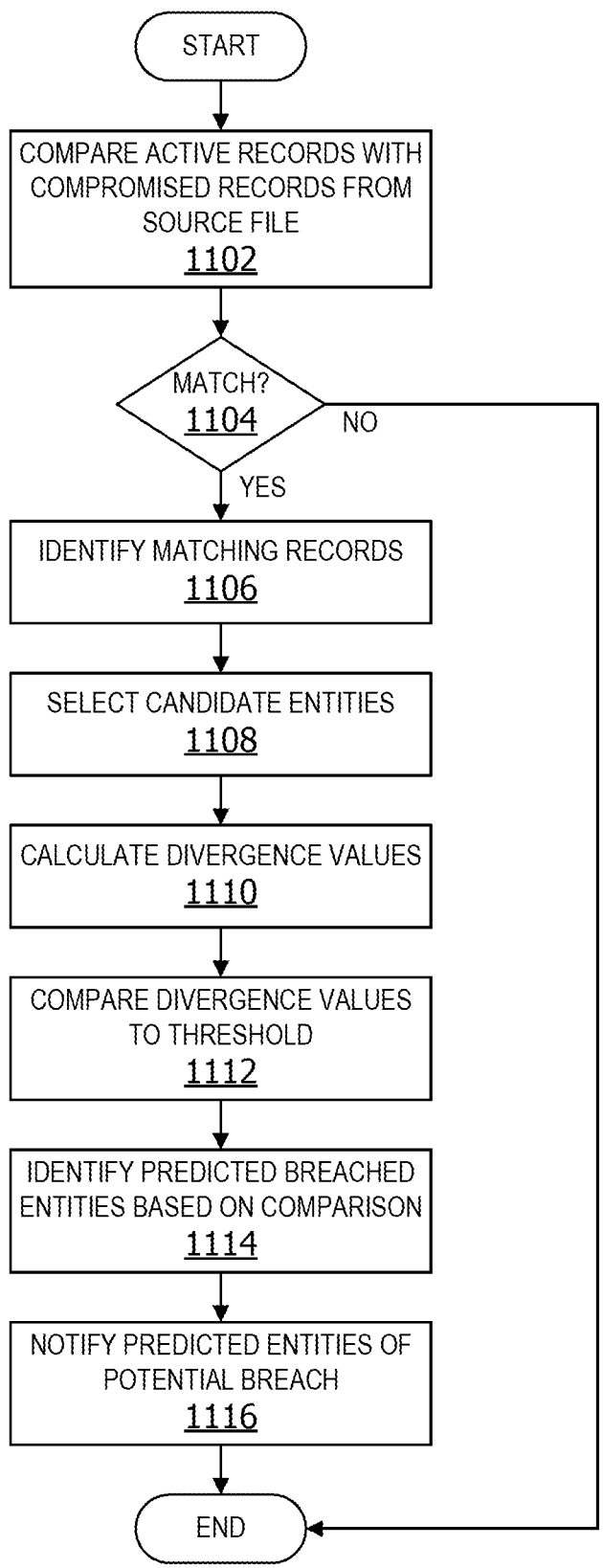
FIG. 11 is an exemplary flow chart illustrating a method of predicting breached entities based on comparison of divergence values according to an embodiment.

FIG. 11 is an exemplary flow chart illustrating a method of predicting breached entities based on comparison of divergence values. It should be understood that the method 1100 as described may be implemented and/or executed by one or more processors associated with one or more components of a system such as systems 100 described above with respect to FIG. 1, FIG. 2, and FIG. 3. At 1102, the breach detection model compares active records with compromised records from a source file. An active record is a record for a transaction completed using an open payment account for an active payment card. If a match is found at 1104, the breach detection model identifies the matching one or more matching records at 1106. Candidate entities associated with the matching records are selected at 1108. Divergence values are calculated between the source file probability distribution values and the probability distribution values for the candidate entities at 1110. The divergence values are compared to a threshold value at 1112. The breach detection model identifies the predicted breached entities based on the comparison at 1114. The breach detection model notifies predicted entities of potential breach at 1116. The process terminates thereafter.

Figure 12:
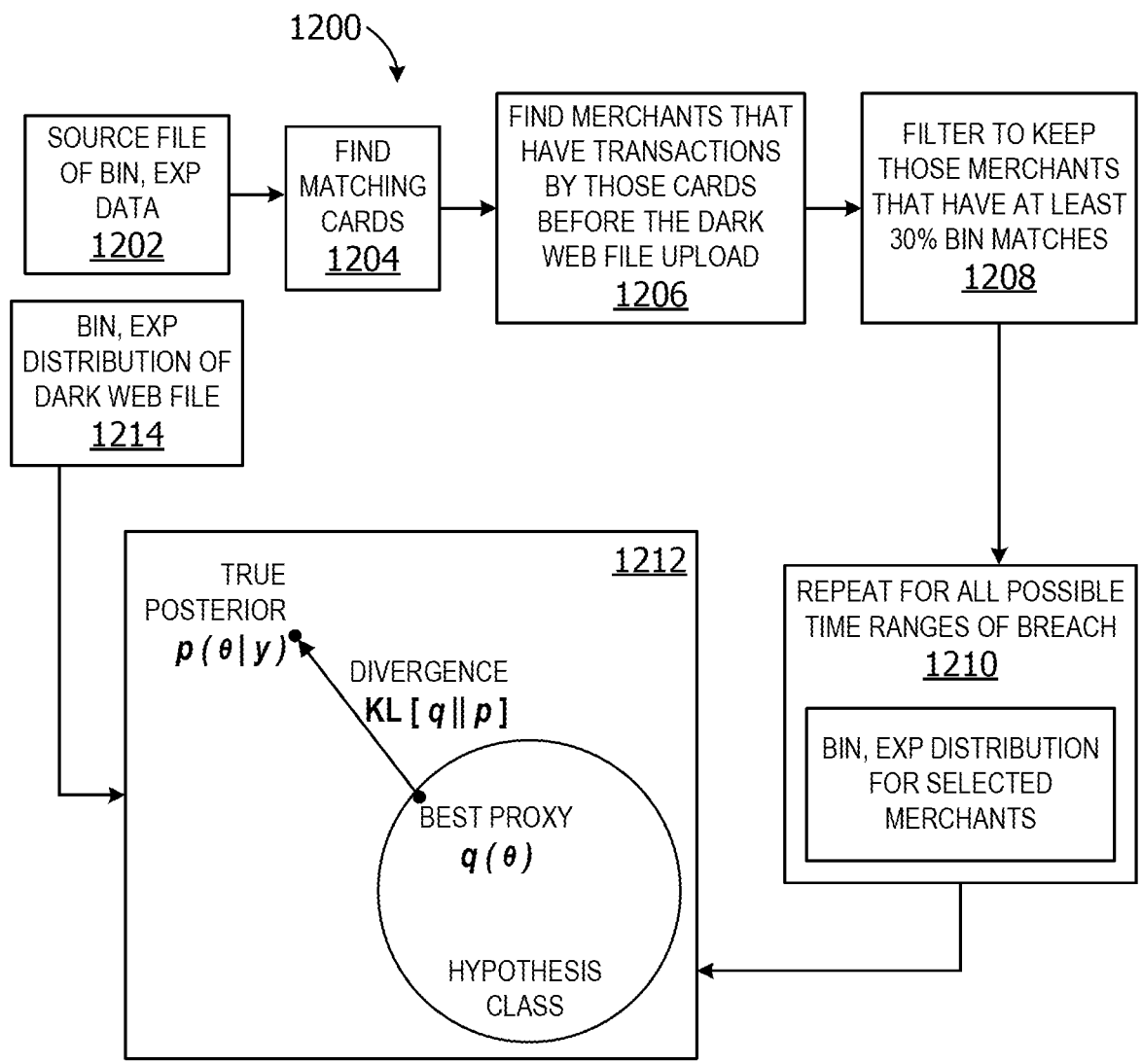
FIG. 12 is an exemplary flow chart illustrating a method of utilizing Bhattacharyya divergence calculations to detect breached merchants according to an embodiment.

FIG. 12 is an exemplary flow chart 1200 illustrating a method of utilizing Bhattacharyya divergence calculations to detect breached merchants according to an embodiment. At 1202, BIN and expiration date data pairs are obtained from a source file obtained from an online source, such as, but not limited to, the dark web. Payment cards utilized during transactions with one or more merchants during a given time period having BIN and expiration date data pairs matching the source file records are found at 1204. In some examples, the matching cards are found by comparing the card expiration dates and identification numbers, including the BIN, with the source file BIN numbers and expiration dates. This process can yield hundreds or thousands of matching cards for each BIN and expiration date pair in the source file.

Merchants that have transactions by those matching cards during the time period before the dark web source file upload are found at 1206. These merchants are candidates for potential breach resulting in exposure of the cards associated with the records in the source file. The candidate merchants are filtered to keep those merchants (entities) that have at least thirty percent BIN matches at 1208. In other words, any candidate merchant having records which match fewer than thirty percent of the source file records are eliminated, as these merchants are unlikely to be the source of the breach exposing the records in the source file. The examples are not limited to utilizing a thirty percent threshold value for filtering. The filter threshold value is a user configurable value which may be adjusted based on the sample size of the records (BIN-expiration date pairs) in the source file. If the number of records in the source file is smaller, the threshold value for filtering may likewise be lowered so as to avoid eliminating potentially breached merchants from the pool of candidate merchant entities.

This process of identifying candidate entities and filtering the entities is repeated for all possible time ranges of the breach at 1210. These time ranges are periods of time prior to posting of the source file online. The time period may be a one-month time period, as well as a time period spanning two or more months. The transactions for each merchant occurring during the selected time period are analyzed to find matching BIN and expiration date pairs for breach analysis.

Divergence between the probability distribution vectors for the source file and each candidate merchant is calculated at 1212. The divergence values are compared to identify the one or more merchant entities most likely having a breach from which the records in the source file may have been obtained by an unauthorized user. The probability distribution vectors for transactions of a given merchant at a particular time showing the smallest divergence (shortest distance) from the BIN and expiration date distribution of the dark web file of the source file probability distribution vectors is selected as the predicted breached merchant at 1214. The predicted breached merchant entity may include a single merchant entity, as well as a combination or group of two or more merchant entities from which the breached merchant(s) can be identified.

FIG. 13 is an exemplary table 1300 illustrating probability distribution vectors for source file records and records associated with events occurring within a selected time period according to an embodiment. The vectors for a source file 1302 are calculated based on the BIN and expiration date pairs and the frequency of each data pair within the source file. The vectors in this non-limiting example adds up to zero. In this example, only two BIN and expiration date pairs are shown. In other examples, a source file can include any number of BIN and expiration date pairs. For example, a source file can include ten BIN and expiration date pairs, a hundred BIN and expiration date pairs or any other number of data pairs.

The probability distribution vectors for a merchant at a time period 1304 are calculated for the cards having BIN and expiration date pairs utilized during transactions within a selected time period prior to upload of the source file to the online source. A divergence value, such as a Bhattacharyya divergence, is calculated to determine how close the vectors for the selected merchant and time period are to the source file vectors. The lower the divergence value (smaller divergence) the closer the candidate merchant records are to the source file records. In other words, the merchant with the lowest divergence value is also the highest confidence candidate for breach prediction (most likely to be the breached merchant). If the divergence value for the top 1 merchant candidate is significantly lower than the divergence value for the next top 2 candidate, then we have a very high confidence the top 1 merchant candidate is the actual merchant that was breached during the selected time period, resulting in the unauthorized access to the records corresponding to the records in the source file.

FIG. 14 is an exemplary table 1400 illustrating Bhattacharyya divergence values calculated for a set of entities for a selected time period according to an embodiment. In this example, the divergence value for the top 1 merchant is 0.07357628. The divergence value for the next top 2 merchant is 0.210426303. The divergence value for the next top 3 merchant entity is 0.2407461128. In this example, the top 1 merchant divergence value is significantly less than the divergence value for the top 2 and top 3 merchants. This "outlier" value, indicating a much shorter distance from the source file vectors, indicates a high confidence prediction that the top 1 merchant is the breached merchant.

In other examples, if the top 1 merchant divergence value and the top 2 merchant divergence value are closer together, our breach prediction is a lower confidence prediction. In this example, if the top 1 merchant divergence value is 0.210426303 and the top 2 merchant candidate divergence value is 0.200746128, the difference between these two values is very low. In such case, the confidence that the top 1 candidate is the breached merchant rather than the top 2 candidate is very low due to the lack of outlier value between our top 2 candidates.

In some non-limiting examples, records in the source file may have been obtained from multiple merchant entities. In other words, a source file may contain records obtained from two different breached merchants.

FIG. 15 is an exemplary table 1500 illustrating divergence values for a two-entity breach scenario according to an embodiment. In this example, the divergence values indicate BIN and expiration date data pairs in a source file were obtained from two breached merchants.

FIG. 16 is an exemplary table 1600 illustrating divergence values calculated where two entities are breached in a base according to an embodiment. The base from which records in the source file were obtained comprises multiple merchants. In this case, the divergence values indicate each merchant having high confidence probability associated with a portion of the data pairs in the source file. In such cases, multiple merchant entities are identified as predicted breached entities. In response, a notification of breach may be sent to both predicted breached entities, as well as the issuers of each compromised card and/or cardholder associated with each card utilized in a transaction with each of the breached merchants during the predicted time period of breach.

Exemplary Operating Environment

Figure 17:
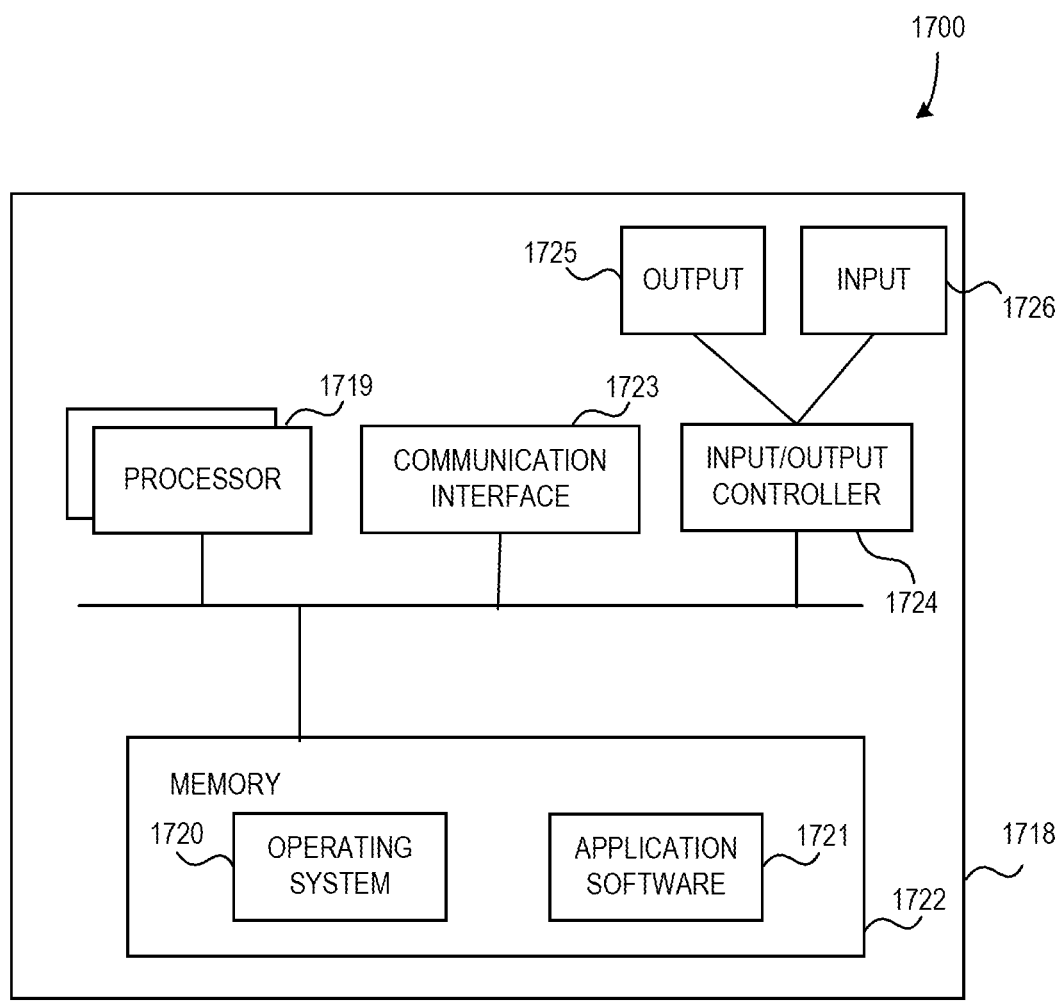
FIG. 17 illustrates a computing apparatus according to an embodiment as a functional block diagram.

The present disclosure is operable with a computing apparatus according to an embodiment as a functional block diagram 1700 in FIG. 17. In an embodiment, a computing apparatus 1718 may be implemented as a part of an electronic device according to one or more embodiments described in this specification. The computing apparatus 1718 comprises one or more processors 1719 which may be microprocessors, controllers, or any other suitable type of processors for processing computer executable instructions to control the operation of the electronic device. Alternatively, or in addition, the processor 1719 is any technology capable of executing logic or instructions, such as a hard-coded machine. Platform software comprising an operating system 1720 or any other suitable platform software may be provided on the apparatus 1718 to enable application software 1721 to be executed on the device. According to an embodiment, monitoring a plurality of clusters and generating unified alerts associated with issues across multiple clusters, as described herein may be accomplished by software, hardware, and/or firmware.

Computer executable instructions may be provided using any computer-readable media that are accessible by the computing apparatus 1718. Computer-readable media may include, for example, computer storage media such as a memory 1722 and communications media. Computer storage media, such as a memory 1722, include volatile and non-volatile, removable, and non-removable media implemented in any method or technology for storage of information such as computer readable instructions, data structures, program modules or the like. Computer storage media include, but are not limited to, RAM, ROM, EPROM, EEPROM, persistent memory, phase change memory, flash memory or other memory technology, CD-ROM, digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 1722) is shown within the computing apparatus 1718, it will be appreciated by a person skilled in the art, that the storage may be distributed or located remotely and accessed via a network or other communication link (e.g. using a communication interface 1723).

The computing apparatus 1718 may comprise an input/output controller 1724 configured to output information to one or more output devices 1725, for example a display or a speaker, which may be separate from or integral to the electronic device. The input/output controller 1724 may also be configured to receive and process an input from one or more input devices 1726, for example, a keyboard, a microphone, or a touchpad. In one embodiment, the output device 1725 may also act as the input device. An example of such a device may be a touch sensitive display. The input/output controller 1724 may also output data to devices other than the output device, e.g. a locally connected printing device. In some embodiments, a user may provide input to the input device(s) 1726 and/or receive output from the output device(s) 1725.

The functionality described herein can be performed, at least in part, by one or more hardware logic devices.

According to an embodiment, the computing apparatus 1718 is configured by the program code when executed by the processor 1719 to execute the embodiments of the operations and functionality described. Alternatively, or in addition, the functionality described herein can be performed, at least in part, by one or more hardware logic devices. For example, and without limitation, illustrative types of hardware logic devices that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example computer system comprises: at least one processor; and at least one memory comprising computer program code, the at least one memory and the computer program code configured to, with the at least one processor, cause the at least one processor to: identify a plurality of matching records each having an identification number and expiration date pair matching an identification number and an expiration date pair of one of a plurality of compromised records associated with a source file; select a set of candidate entities each having at least one event associated with at least one of the identified plurality of matching records during a time period; for each entity in the selected set of candidate entities, calculate a divergence value representing a distance between a set of probability distribution vectors for a plurality of records stored by the entity during the time period and a set of probability distribution vectors for the plurality of compromised records; compare the calculated divergence values to a threshold value; based on the comparison, identify a set of predicted breached entities from the selected set of candidate entities; and notify, via a communications interface device, at least one entity within the identified set of predicted breached entities of the breach and the time period, the notification comprising a recommendation to label the plurality of records stored by the at least one entity as compromised.

A computerized method for predictive detection of breached entities includes identifying a plurality of matching records each having an identification number and expiration date pair matching an identification number and an expiration date pair of one of a plurality of compromised records associated with a source file; selecting a set of candidate entities each having at least one event associated with at least one of the identified plurality of matching records during a time period; for each entity in the selected set of candidate entities, calculating a divergence value representing a distance between a set of probability distribution vectors for a plurality of records stored by the entity during the time period and a set of probability distribution vectors for the plurality of compromised records; comparing the calculated divergence values to a threshold value; based on the comparison, identify a set of predicted breached entities from the selected set of candidate entities; and notifying, via a communications interface device, at least one entity within the identified set of predicted breached entities of the breach and the time period, the notification comprising a recommendation to label the plurality of records stored by the at least one entity as compromised.

One or more exemplary non-transitory computer readable storage media comprise computer-executable instructions for predictive detection of breached entities that, upon execution by a processor, cause the processor to at least: identify a plurality of matching records (accounts) each having an identification number and expiration date pair matching an identification number and an expiration date pair of one of a plurality of compromised records associated with a source file; select a set of candidate entities (merchants) each having at least one event (transaction) associated with at least one of the identified plurality of matching records during a time period; for each entity in the selected set of candidate entities, calculate a divergence value representing a distance between a set of probability distribution vectors for a plurality of records stored by the entity during the time period and a set of probability distribution vectors for the plurality of compromised records; compare the calculated divergence values to a threshold value; based on the comparison, identify a set of predicted breached entities from the selected set of candidate entities; and notify, via a communications interface device, at least one entity within the identified set of predicted breached entities of the breach and the time period, the notification comprising a recommendation to label the plurality of records stored by the at least one entity as compromised.

In some examples, the system uses only BIN and expiry information from stolen cards posted on the web to identify possible candidate entities having payment card records matching the BIN and expiry information. The merchant entities are filtered based on the number of BIN and expiry date combinations present for each merchant.

Alternatively, or in addition to the other examples described herein, examples include any combination of the following:
- generate a first set of probability distribution vectors for the plurality of compromised records associated with the source file; generate a second set of probability distribution vectors for a first plurality of records stored by a first entity selected from the set of candidate entities during a first time period; generate a third set of probability distribution vectors for a second plurality of records stored by a second entity selected from the set of candidate entities during the first time period; calculate a first divergence value representing a distance between the first set of probability distribution vectors and the second set of probability distribution vectors; calculate a second divergence value representing a distance between the first set of probability distribution vectors and the third set of probability distribution vectors; select the first entity as a predicted breached entity on condition the first divergence value is less than the second divergence value; and select the second entity as the predicted breached entity on condition the second divergence value is less than the first divergence value;
- generate a first set of probability distribution vectors for the plurality of compromised records associated with the source file; generate a second set of probability distribution vectors for a first plurality of records stored by a first entity selected from the set of candidate entities during a first time period; generate a third set of probability distribution vectors for the first plurality of records stored by the first entity selected from the set of candidate entities during a second time period; calculate a first divergence value representing a distance between the first set of probability distribution vectors and the second set of probability distribution vectors for the first time period; and calculate a second divergence value representing a distance between the first set of probability distribution vectors and the third set of probability distribution vectors for the second time period;
- wherein calculate a distance operations includes: calculate a first Bhattacharyya divergence value representing a distance between the first set of probability distribution vectors and the second set of probability distribution vectors for a selected time period; and calculate a second Bhattacharyya divergence value representing a distance between the first set of probability distribution vectors and the third set of probability distribution vectors for the selected time period.
- calculate a first KL divergence value representing a distance between the first set of probability distribution vectors and the second set of probability distribution vectors for a selected time period; and calculate a second KL divergence value representing a distance between the first set of probability distribution vectors and the third set of probability distribution vectors for the selected time period;
- a machine learning algorithm that dynamically identifies the set of candidate entities from a plurality of possible entities and a set of possible time periods for potential occurrence of a breach, wherein the machine learning is trained using training data and feedback to refine identification of breached merchants and time of breach occurrence; and
- output, via a communications interface device, to at least one remote computing device, a notification of predicted breach, the notification of predicted breach comprising an identification of at least one predicted breached entity, a predicted time period of occurrence of the breach and a set of identification numbers associated with at least one compromised record associated with at least one event during the predicted time period.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for identifying a plurality of matching records each having an identification number and expiration date pair matching an identification number and an expiration date pair of one of a plurality of compromised records associated with a source file; exemplary means for selecting a set of candidate entities each having at least one event associated with at least one of the identified plurality of matching records during a time period; exemplary means for calculating a divergence value representing a distance between a set of probability distribution vectors for a plurality of records stored by an entity during the time period and a set of probability distribution vectors for the plurality of compromised records; exemplary means for comparing the calculated divergence values to a threshold value; exemplary means for identifying a set of predicted breached entities from the selected set of candidate entities based on the comparison; and exemplary means for notifying at least one entity within the identified set of predicted breached entities of the breach and the time period, the notification comprising a recommendation to label the plurality of records stored by the at least one entity as compromised.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for predictive detection of breached entities associated with compromised records from a breach, the system comprising:
at least one processor; and
at least one memory comprising computer program code that, when executed by the at least one processor, is operable to:
identify a plurality of matching records each having an identification number and expiration date pair matching an identification number and an expiration date pair of one of a plurality of compromised records associated with a source file;
select a set of candidate entities each having at least one event associated with at least one of the plurality of matching records during a time period;
generate a first set of probability distribution vectors for the plurality of compromised records associated with the source file;
generate a second set of probability distribution vectors for a first plurality of records stored by a first entity selected from the set of candidate entities during a first time period;
generate a third set of probability distribution vectors for a second plurality of records stored by a second entity selected from the set of candidate entities during the first time period;
calculate a first divergence value representing a distance between the first set of probability distribution vectors and the second set of probability distribution vectors;
calculate a second divergence value representing a distance between the first set of probability distribution vectors and the third set of probability distribution vectors;

select the first entity as a predicted breached entity on condition the first divergence value is less than the second divergence value; and
select the second entity as the predicted breached entity on condition the second divergence value is less than the first divergence value.

2. The system of claim 1, further comprising:
for each entity in the set of candidate entities, calculate a divergence value representing a distance between a set of probability distribution vectors for a plurality of records stored by the entity during the time period and a set of probability distribution vectors for the plurality of compromised records;
compare the calculated divergence values to a threshold value;
identify a set of predicted breached entities from the set of candidate entities based on the comparison; and
notify, via a communications interface device, at least one entity within the set of predicted breached entities of the breach and the time period, the notification comprising a recommendation to label the plurality of records stored by the at least one entity as compromised.

3. The system of claim 1, further comprising:
generate a fourth set of probability distribution vectors for the first plurality of records stored by the first entity selected from the set of candidate entities during a second time period;
and
calculate a third divergence value representing a distance between the first set of probability distribution vectors and the fourth set of probability distribution vectors for the second time period.

4. The system of claim 1, further comprising:
calculate a first Bhattacharyya divergence value representing a distance between a first set of probability distribution vectors and a second set of probability distribution vectors for a selected time period; and
calculate a second Bhattacharyya divergence value representing a distance between the first set of probability distribution vectors and a third set of probability distribution vectors for the selected time period.

5. The system of claim 1, further comprising:
calculate a first Kullback-Leibler (KL) divergence value representing a distance between the first set of probability distribution vectors and the second set of probability distribution vectors for a selected time period; and
calculate a second KL divergence value representing a distance between the first set of probability distribution vectors and the third set of probability distribution vectors for the selected time period.

6. The system of claim 1, further comprising:
a machine learning algorithm that dynamically identifies the set of candidate entities from a plurality of possible entities and a set of possible time periods for potential occurrence of a breach.

7. The system of claim 1, further comprising:
output, via a communications interface device, to at least one remote computing device, a notification of predicted breach, the notification of predicted breach comprising an identification of at least one predicted breached entity, a predicted time period of occurrence of the breach and a set of identification numbers associated with at least one compromised record associated with at least one event during the predicted time period.

8. A computerized method for predictive detection of breached entities associated with compromised records from a breach, the method comprising:
  identifying a plurality of matching records each having an identification number and expiration date pair matching an identification number and an expiration date pair of one of a plurality of compromised records associated with a source file;
  selecting a set of candidate entities each having at least one event associated with at least one of the plurality of matching records during a time period;
  generating a first set of probability distribution vectors for the plurality of compromised records associated with the source file;
  generating a second set of probability distribution vectors for a first plurality of records stored by a first entity selected from the set of candidate entities during a first time period;
  generating a third set of probability distribution vectors for a second plurality of records stored by a second entity selected from the set of candidate entities during the first time period;
  calculating a first divergence value representing a distance between the first set of probability distribution vectors and the second set of probability distribution vectors;
  calculating a second divergence value representing a distance between the first set of probability distribution vectors and the third set of probability distribution vectors;
  selecting the first entity as a predicted breached entity on condition the first divergence value is less than the second divergence value; and
  selecting the second entity as the predicted breached entity on condition the second divergence value is less than the first divergence value.

9. The computerized method of claim 8, further comprising:
  calculating a divergence value representing a distance between a set of probability distribution vectors for a plurality of records stored by each entity in the set of candidate entities during the time period and a set of probability distribution vectors for the plurality of compromised records;
  comparing the calculated divergence values to a threshold value;
  identifying a set of predicted breached entities from the set of candidate entities based on the comparison; and
  notifying, via a communications interface device, at least one entity within the set of predicted breached entities of the breach and the time period, the notification comprising a recommendation to label the plurality of records stored by the at least one entity as compromised.

10. The computerized method of claim 8, further comprising:
  generating a fourth set of probability distribution vectors for the first plurality of records stored by the first entity selected from the set of candidate entities during a second time period; and
  calculating a third divergence value representing a distance between the first set of probability distribution vectors and the fourth set of probability distribution vectors for the second time period.

11. The computerized method of claim 8, further comprising:
  calculating a first Bhattacharyya divergence value representing a distance between a first set of probability distribution vectors and a second set of probability distribution vectors for a selected time period; and
  calculating a second Bhattacharyya divergence value representing a distance between the first set of probability distribution vectors and a third set of probability distribution vectors for the selected time period.

12. The computerized method of claim 8, further comprising:
  calculating a first Kullback-Leibler (KL) divergence value representing a distance between a first set of probability distribution vectors and a second set of probability distribution vectors for a selected time period; and
  calculating a second KL divergence value representing a distance between the first set of probability distribution vectors and a third set of probability distribution vectors for the selected time period.

13. The computerized method of claim 8, further comprising:
  identifying, by a machine learning algorithm, at least one candidate entity from a plurality of possible entities and at least one time period from a set of possible time periods for potential occurrence of a breach.

14. The computerized method of claim 8, further comprising:
  outputting, via a communications interface device, to at least one remote computing device, a notification of predicted breach, the notification of predicted breach comprising an identification of at least one predicted breached entity, a predicted time period of occurrence of the breach and a set of identification numbers associated with at least one compromised record associated with at least one event during the predicted time period.

15. One or more non-transitory computer storage media having computer-executable instructions for predictive detection of breached entities associated with compromised records from a breach that, upon execution by a processor, cause the processor to at least:
  identify a plurality of matching records each having an identification number and expiration date pair matching an identification number and an expiration date pair of one of a plurality of compromised records associated with a source file;
  select a set of candidate entities each having at least one event associated with at least one of the plurality of matching records during a time period;
  generate a first set of probability distribution vectors for the plurality of compromised records associated with the source file;
  generate a second set of probability distribution vectors for a first plurality of records stored by a first entity selected from the set of candidate entities during a first time period;
  generate a third set of probability distribution vectors for a second plurality of records stored by a second entity selected from the set of candidate entities during the first time period;
  calculate a first divergence value representing a distance between the first set of probability distribution vectors and the second set of probability distribution vectors;

calculate a second divergence value representing a distance between the first set of probability distribution vectors and the third set of probability distribution vectors;

select the first entity as a predicted breached entity on condition the first divergence value is less than the second divergence value; and select the second entity as the predicted breached entity on condition the second divergence value is less than the first divergence value.

16. The one or more computer storage media of claim 15, wherein the computer-executable instructions, upon execution by a processor, further cause the processor to at least:

for each entity in the set of candidate entities, calculate a divergence value representing a distance between a set of probability distribution vectors for a plurality of records stored by the entity during the time period and a set of probability distribution vectors for the plurality of compromised records;

compare the calculated divergence values to a threshold value;

identify a set of predicted breached entities from the set of candidate entities based on the comparison; and notify, via a communications interface device, at least one entity within the set of predicted breached entities of the breach and the time period, the notification comprising a recommendation to label the plurality of records stored by the at least one entity as compromised.

17. The one or more computer storage media of claim 15, wherein the computer-executable instructions, upon execution by a processor, further cause the processor to at least:

generate a fourth set of probability distribution vectors for the first plurality of records stored by the first entity selected from the set of candidate entities during a second time period; and calculate a third divergence value representing a distance between the first set of probability distribution vectors and the fourth set of probability distribution vectors for the second time period.

18. The one or more computer storage media of claim 15, wherein the computer-executable instructions, upon execution by a processor, further cause the processor to at least:

calculate a first Bhattacharyya divergence value representing a distance between a first set of probability distribution vectors and a second set of probability distribution vectors for a selected time period; and calculate a second Bhattacharyya divergence value representing a distance between the first set of probability distribution vectors and a third set of probability distribution vectors for the selected time period.

19. The one or more computer storage media of claim 15, wherein the computer-executable instructions, upon execution by a processor, further cause the processor to at least:

calculate a first Kullback-Leibler (KL) divergence value representing a distance between a first set of probability distribution vectors and a second set of probability distribution vectors for a selected time period; and calculate a second KL divergence value representing a distance between the first set of probability distribution vectors and a third set of probability distribution vectors for the selected time period.

20. The one or more computer storage media of claim 15, wherein the computer-executable instructions, upon execution by a processor, further cause the processor to at least:

identify, by a machine learning algorithm, the set of candidate entities from a plurality of possible entities and a set of possible time periods for potential occurrence of a breach.

* * * * *